US010721558B2

(12) United States Patent
Cannings

(10) Patent No.: US 10,721,558 B2
(45) Date of Patent: Jul. 21, 2020

(54) AUDIO RECORDING SYSTEM AND METHOD

(71) Applicant: Nigel Henry Cannings, London (GB)

(72) Inventor: Nigel Henry Cannings, London (GB)

(*) Notice: Subject to any disclaimer, the term of this patent is extended or adjusted under 35 U.S.C. 154(b) by 0 days.

(21) Appl. No.: 16/186,196

(22) Filed: Nov. 9, 2018

(65) Prior Publication Data
US 2019/0149917 A1 May 16, 2019

(30) Foreign Application Priority Data

Nov. 10, 2017 (GB) .................................. 1718640.4

(51) Int. Cl.
H04R 3/00 (2006.01)
H04M 3/42 (2006.01)
G11B 27/031 (2006.01)
G11B 27/10 (2006.01)
H04L 12/18 (2006.01)
H04M 3/56 (2006.01)
G01S 19/25 (2010.01)
G06F 3/16 (2006.01)
H04R 1/40 (2006.01)
H04R 1/02 (2006.01)
G11B 20/10 (2006.01)

(52) U.S. Cl.
CPC ............. *H04R 3/005* (2013.01); *G01S 19/25* (2013.01); *G06F 3/165* (2013.01); *G11B 27/031* (2013.01); *G11B 27/10* (2013.01); *H04L 12/1831* (2013.01); *H04M 3/42221* (2013.01); *H04M 3/568* (2013.01); *H04R 1/406* (2013.01); *G11B 2020/10537* (2013.01); *H04M 3/56* (2013.01)

(58) Field of Classification Search
CPC ......... H04R 3/005; H04R 1/406; G01S 19/25; G06F 3/165; G11B 27/031; G11B 27/10; G11B 2020/10537; H04L 12/1831; H04M 3/42221; H04M 3/568; H04M 3/56
USPC ...................................................... 381/92, 91
See application file for complete search history.

(56) References Cited

U.S. PATENT DOCUMENTS

| 8,385,814 | B2 | 2/2013 | Sanders et al. |
| 9,253,452 | B2 | 2/2016 | Ross et al. |
| 2010/0217414 | A1 | 8/2010 | Sanders et al. |
| 2014/0355951 | A1 | 12/2014 | Tabak |

(Continued)

FOREIGN PATENT DOCUMENTS

| EP | 2775694 A9 | 4/2016 |
| WO | 2009026347 A1 | 2/2009 |

(Continued)

*Primary Examiner* — Ammar T Hamid
(74) *Attorney, Agent, or Firm* — Fogg & Powers LLC

(57) ABSTRACT

The present disclosure provides a method and system of recording an audio event which comprises a plurality of audio sources. This comprises: synchronizing a plurality of audio recording devices prior to commencement of the audio event, each recording device being suitably disposed to record audio from a single audio source and operable to provide a single audio source recording for the duration of the audio event; receiving the single audio source recording provided by each of the said audio recording devices; and processing the plurality of received single audio source recordings to synchronously combining the plurality of single audio source recordings to construct a single audio event recording.

15 Claims, 3 Drawing Sheets

(56) References Cited

U.S. PATENT DOCUMENTS

| | | | |
|---|---|---|---|
| 2015/0050003 A1 | 2/2015 | Ross et al. | |
| 2017/0053674 A1* | 2/2017 | Fisher | .................... H04N 21/84 |
| 2017/0238092 A1 | 8/2017 | Isberg | |
| 2017/0374115 A1* | 12/2017 | Sinclair | ............. H04M 3/42221 |

FOREIGN PATENT DOCUMENTS

| | | |
|---|---|---|
| WO | 2014072772 A1 | 5/2014 |
| WO | 2014193593 A2 | 12/2014 |
| WO | 2016168277 A1 | 10/2016 |
| WO | 2017019700 A1 | 2/2017 |

\* cited by examiner

AUDIO RECORDING SYSTEM AND METHOD

CROSS-REFERENCE TO RELATED APPLICATIONS

This U.S. patent application claims priority to, and the benefit of Great Britain Patent Application No. 1718640.4, titled "AN AUDIO RECORDING SYSTEM AND METHOD" filed on Nov. 10, 2017, which is incorporated herein by reference in its entirety.

TECHNICAL FIELD

The present disclosure relates to audio recording systems and methods and particularly to audio recording systems and methods for simultaneously recording a plurality of sources of audio.

BACKGROUND

Audio is generally recorded so as to provide a record copy of an occasion such as, for example, a meeting, an interview or a performance involving two or more sources of audio or participants.

For example, for journalist interviews, business meetings and courtroom trials, it is important to have a verbatim recorded record of the interviews, meetings and trials to ensure that everything that has been said has been captured and can be accurately referred to at a later date. This applies equally to more structured meeting environments in offices.

However, referring to FIG. 1A, the quality of these recordings is often extremely poor, as a single device 10, such as a Dictaphone or digital voice recorder is used to capture the audio, for example, speech, from a plurality of sources and/or participants 12*a*, 12*b*, 12*c*, 12*d* and 12*e*. Similarly, meetings undertaken through conference calls are often made using a single conference phone which usually results in unreliable and often poor audio capture.

The reason for this is that the further away from the microphone a person is, the less clear the resulting audio is. This is known in speech-recognition as "far field" audio capture.

To overcome this, an array of microphones 14*a*-14*h* can be installed, for example, in a board room or interview room, as shown in FIG. 1B. These consist of multiple microphones places in fixed positions. Each individual microphone captures a separate audio stream, and these are then post-processed using a technique called "beamforming" which allows individual audio streams to be reconstructed. This technique relies upon the different speeds at which the same audio signal reaches each microphone These fixed microphone setups are effective in overcoming the "far field" problem, but are relatively expensive and require infrastructure to be put in place prior to meetings taking place. Moreover, because of the nature of this setup being of fixed microphones, it does not overcome problems associated with recording of conference call meetings when two or more participants are remote from each other.

Accordingly, there is a need in the industry for there to be a media recording system and method which addresses the disadvantages of known systems and methods.

An objective of the present disclosure is to provide a media recording system and method which is inexpensive and provides quality recording of audio for both local recording, wherein audio sources and/or participants are in relatively close proximity, and remote recording, wherein audio sources and/or participants are relatively remote from each other, for example, in different offices, cities or countries. There is also the associated problem that participants who are geographically separated will experience different time delays and the can be a persistent problem of people talking over one another as they do not correctly anticipate another person is finished speaking due to the time delay.

SUMMARY

According to a first aspect of the present disclosure there is provided a method of recording an audio event which comprises a plurality of audio sources, the method comprising: synchronizing a plurality of audio recording devices prior to commencement of the audio event, each recording device being suitably disposed to record audio from a single audio source and operable to provide a single audio source recording for the duration of the audio event; receiving the single audio source recording provided by each of the said audio recording devices; and processing the plurality of received synchronously recordings to combine the plurality of single audio source recordings to construct a single audio event recording.

At least one of the recording devices may be a smartphone.

The method advantageously further comprises providing each of the recording devices with an event identification code, unique to the audio event to be recorded.

The method advantageously further comprises providing each of the recording devices with a start instruction prior to commencement of the audio event.

The start instruction is advantageously an automated start instruction operable to synchronously start the recording function on each of the recording devices such as at a specified future time. The devices can therefore be started simultaneously.

The synchronous start of recording on each of the recording devices may be actuated upon receipt of confirmation of entry of an event identification code into each of the recording devices. The synchronous start of recording on each of the recording devices may preferably be actuated subsequent to receipt of confirmation of entry of an event identification code into each of the recording devices. Hence, actuation may be a precursor to receipt of an automated start instruction which then provides simultaneous start.

Alternatively, the start instruction may provide a start alert to each of the said recording devices to inform when a manual start of the recording device can be enacted.

The start alert is advantageously provided upon receipt of confirmation of entry of an event identification code into each of the recording devices.

The plurality of recording devices are advantageously synchronized using at least one of: a Global Positioning System (GPS); Global System for Mobile Communications (GSM); and a local beacon thereof. This is advantageous as an accurate global time stamp is therefore available for effective synchronisation.

The method advantageously further comprises an event manager operable to control the start and synchronization of the plurality of audio recording devices. This control may be by providing the aforementioned automated start instruction. Preferably the event manager comprises a set of pre-defined users, such as entered by an administrator. The method then preferably comprises the steps of providing each user with a unique event identification code. Receiving confirmation, such as automatic confirmation that the code has been used by the user to a (i.e. their associated) recording device.

Providing each user device with a future synchronous start time, such as only when all devices have been had their event codes confirmed by the event manager and then sending a start to every recording device ahead of the future synchronous start time. This enable all recording devices to be started synchronously.

As timing of incoming recorded data can be critical to providing a beamforming and in conjunction with the far field problem the event manager preferably sends an audio signal to each device separately and records a return time of the audio signal so as to determine the relative time delay for each user's recording device. This information is then used to synchronise incoming audio to a synchronous local time at the event manager.

In the present disclosure the time delay between receipt of signals from different recording devices is used to stretch the audio signal from near audio devices to compensate for the time delay on reaching remote audio devices. Specifically, the signal from each recording device is stretched to provide a simultaneous finish in transmission of the audio to all remote devices. For example, given three participants one at the event manager, one with a 50 ms delay and another with a 200 ms delay then the signal from the event manager is stretched by hundred and 50 ms for the second participant so that the second and third participant both receive the information the same time, which reduces the potential for differential response times and mutual interruption. This also enables recording be better synchronised for beamforming and the more accurate aggregate signal created.

The event manager may be located on a remote server. The event manager is intended as a software application and not a person, a person such as a chairperson or administrator may operate the event manager.

Alternatively, or additionally, the event manager may be located on one of the plurality recording devices. This enables a chairperson/administrator of the meeting to initiate the meeting from a single local device.

At least one of the recording devices may be disposed remote from another of the recording devices.

According to a second aspect of the present disclosure there is provided a non-transient computer-readable storage device having instructions stored which, when executed by a computing device, result in the computing device performing operations in accordance with a method according to the first aspect of the present disclosure.

Accordingly to a third aspect of the present disclosure, there is provided an audio recording system operable to record an event which comprises a plurality of audio sources, the system comprising: an event start synchronizing processor operable to synchronize a plurality of audio recording devices prior to commencement of the audio event, each recording device being suitably disposed to record audio from a single audio source and operable to provide a single audio source recording for the duration of the audio event; a receiving processor operable to receive the single audio source recording provided by each of the audio recording devices; a recording synchronizing processor operable to process the single audio source recordings to construct a single audio event recording.

A single audio source preferably refers to an audio signal from a (single) environment rather than a single sound source as such. Alternatively, the single audio source can refer to a single source of audio information, such as in electronic format from a single microphone. These two meanings of single sound source may be combined, hence being a plurality of microphones detecting sound in a single audio environment (e.g. a room or enclosed space).

At least one of the recording devices may be a smartphone.

The system advantageously comprises an event manager operable to control the start and synchronization of the plurality of audio recording devices.

The event manager may be located on a remote server.

Alternatively, or additionally, the event manager may be located on one of the plurality recording devices.

The event manager is advantageously operable to provide each of the recording devices with an event identification code, unique to the audio event to be recorded.

The event manager is advantageously operable to provide each of the recording devices with a start instruction prior to commencement of the audio event.

The start instruction is advantageously an automated start instruction operable to synchronously start the recording function on each of the recording devices.

The synchronous start of recording on each of the recording devices may be actuated upon receipt of confirmation of entry of an event identification code into each of the recording devices.

Alternatively, or additionally, the start instruction may provide a start alert to each of the said recording devices to inform when a manual start of the recording device can be enacted.

The start alert is advantageously provided upon receipt of confirmation of entry of an event identification code into each of the recording devices.

The plurality of recording devices are advantageously synchronized using at least one of: a Global Positioning System (GPS); Global System for Mobile Communications (GSM); and a local beacon.

At least one of the recording devices may be disposed remote from another of the recording devices.

DRAWINGS

The present disclosure will now be described, by way of example only, with reference to the accompanying drawings, in which.

DETAILED DESCRIPTION

Figure 1A:
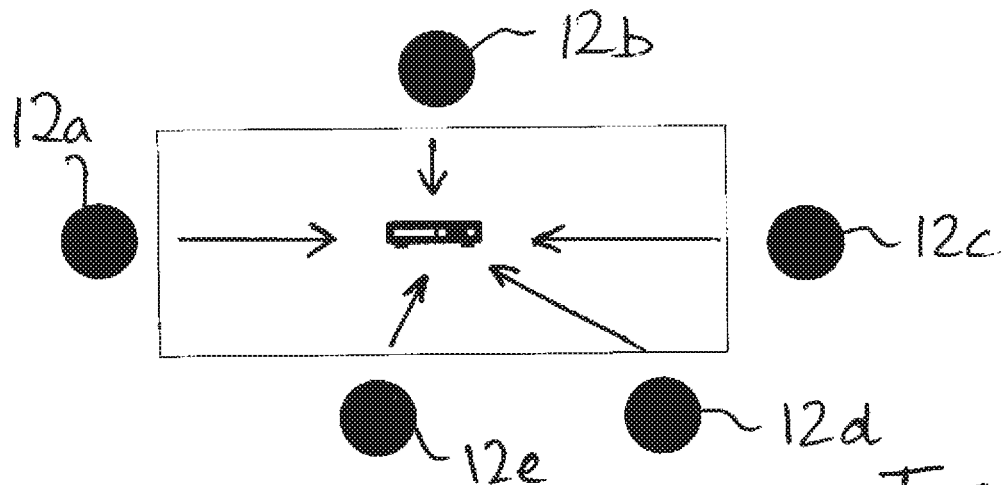
FIGS. 1A and 1B are schematic drawings of recording systems and methods accordingly to the prior art.
Figure 1B:
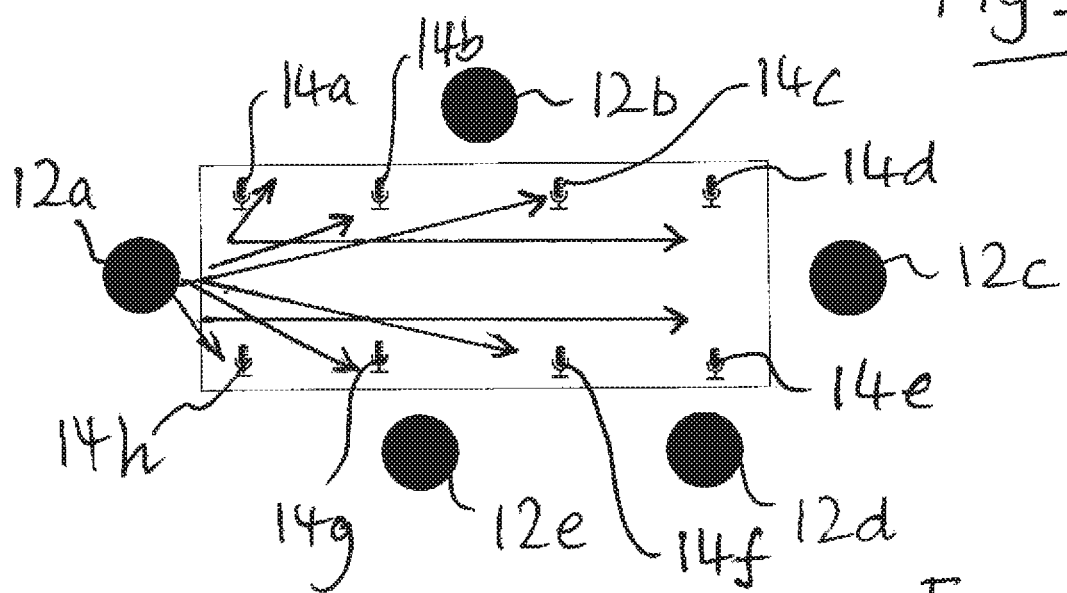
Figure 2:
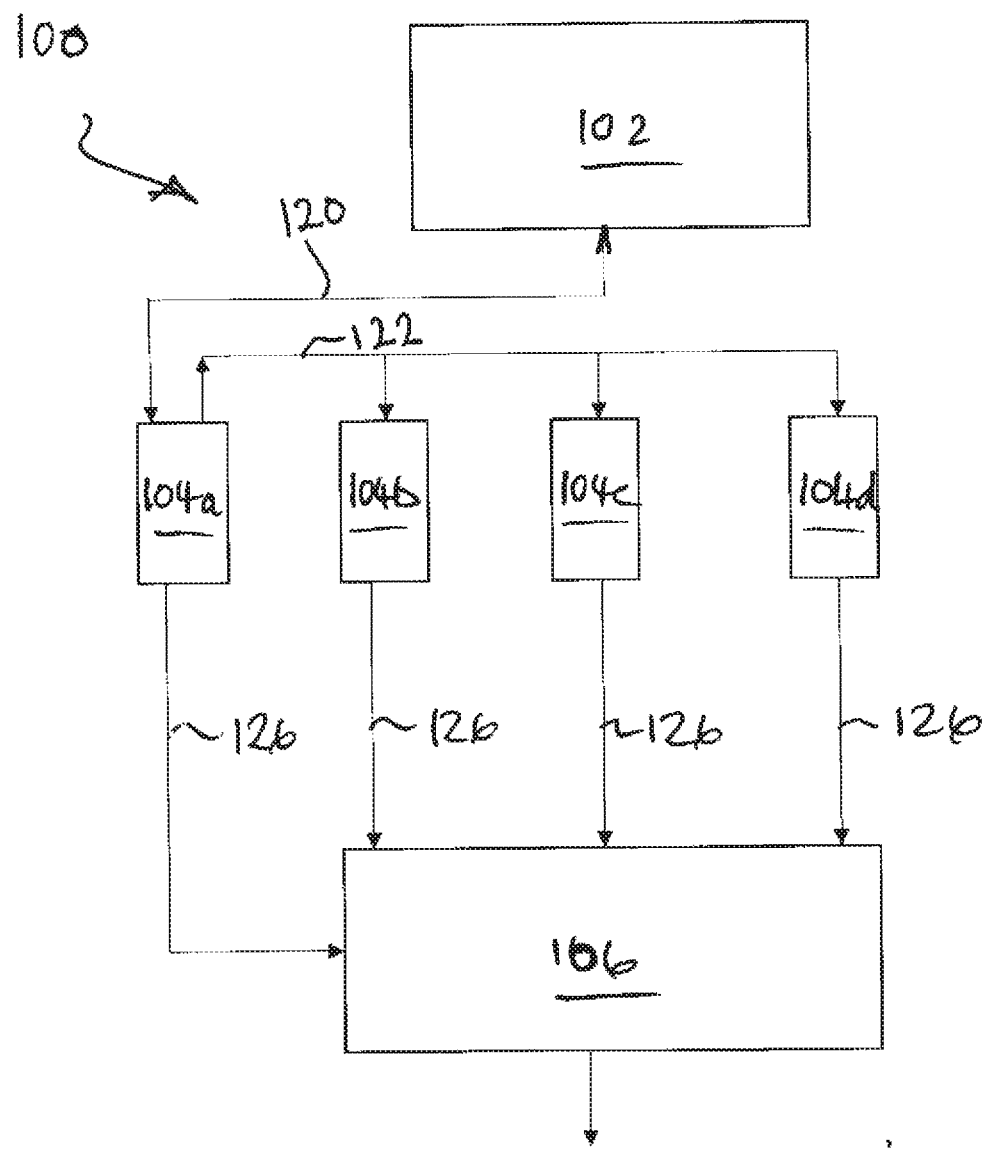
FIG. 2 is a schematic drawing of a method and system according to the present disclosure.

Referring to FIG. 2, a method and system 100 according to the present disclosure comprises providing an event manager 102, a plurality of audio recorders 104a-d, and a recording synchronizing processor 106. Although four audio recorders 104a-d are shown in the drawings, any plurality of audio recorders may be used.

The recording devices 104a-d (or at least one of the recording devices) are preferably smartphones. However, any other suitable type of recording device may also be used. Each recording devices may have a unique identifier, that can be used to identify the device. Preferably user will also login with their username and email address to an app running in software on the recording device. This provides means we will be able to associate the device to the user. If the recording device is a smartphone, the recording device may be identified in the event information by the mobile phone number associated with the smartphone.

The event manager 102 is hosted on a computer server 108, which may be disposed locally or remotely relative to one or more of the plurality of audio recorders 104a-104d. In an alternative embodiment, the event manager may be hosted on a master audio recorder, such as, for example, audio recorder 104a.

Each audio recorder 104a-104d is suitably disposed to record a single audio source, such as, for example, each participant in a business meeting. Each of the audio recorders 104a-104d may be located locally relatively to each other, wherein the audio sources and/or participants are in relatively close proximity, or remotely relative to each other, wherein the audio sources and/or participants are relatively remote from each other, for example, in different offices, cities or countries. The audio recorders 104a-104d may alternatively be disposed as a combination of local and remote recording. This is particularly advantageous, as it enables participation in events, such as meetings, and quality recordings of events to be undertaken at short notice using readily available equipment, such as, for example, a smartphone.

In use, an event organizer (i.e. a user), who is initiating the audio event, uses audio recorder 104a to communicate with the event manager 102. The user accesses the event manager using a personal identification and security code. Having accessed the event manager 102, the event organizer generates an event information file, associated with the audio event to be recorded. The event information file is stored on the server 108. The event information includes, for example, a list of the recording devices 104a-104d taking part in the audio event and the associated participants (if appropriate), and the proposed start time of the audio event. The event information file may also have additional features such as, for example, copies of documents, media files or anything else which may be required during the audio event.

The event manager 102 generates an event identification code, unique to the audio event to be recorded, and accords the event identification code to the event information. The event manager 102 also generates a start instruction. The start instruction is preferably an automated start instruction. However, alternatively the start instruction may be a manual start instruction. The start instruction is also associated with the event information file. In an alternative embodiment at least one of the event identification code, start instruction and event information file can be generated on the recording device 104a, using a smartphone App.

Figure 3:
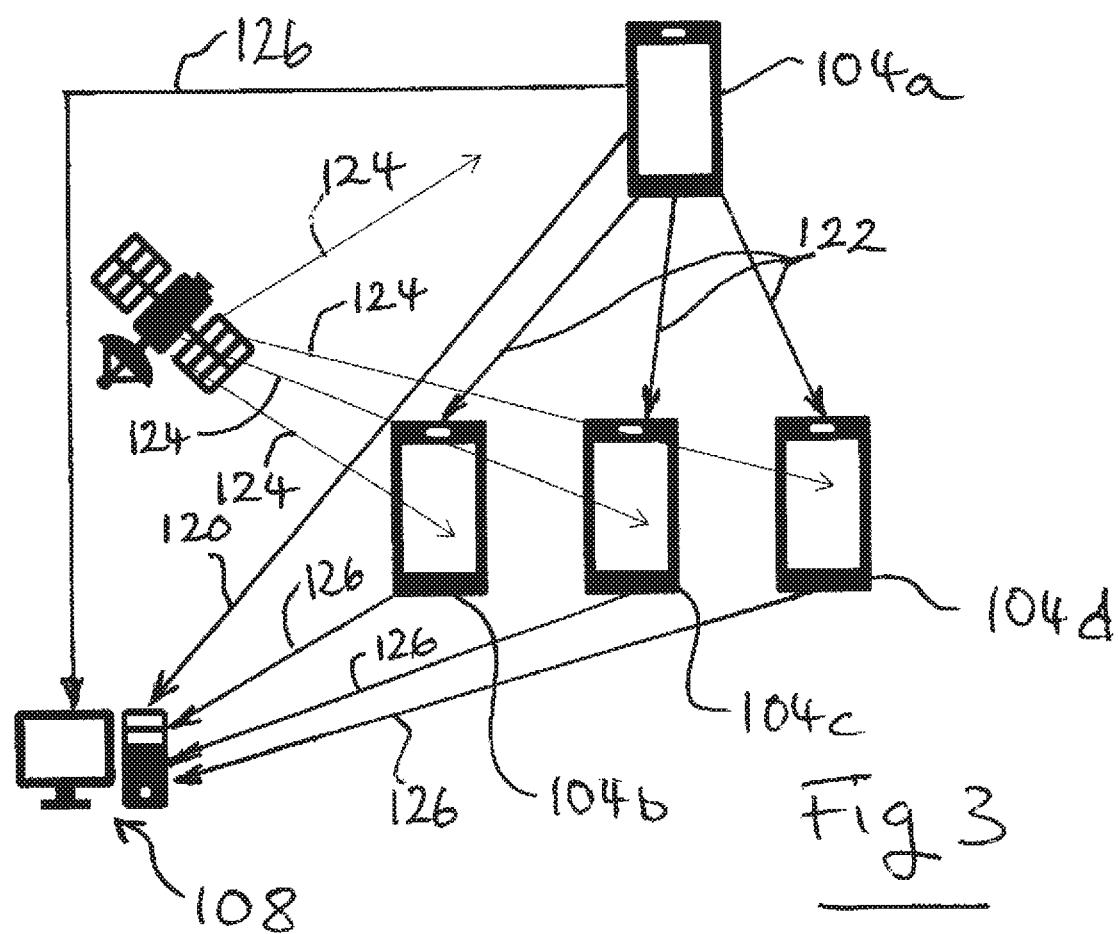
FIG. 3 is a schematic drawing showing the communication paths of the method and system of FIG. 2.

Referring to FIG. 3, in step 120, ahead of the audio event start time, the event organizer (i.e. user) accesses the event manager 102 and retrieves the event information file and start instructions using the event identification code.

In step 122, the event organizer uses audio recorder 104a to communicate with the other audio recording devices 104b-104d and initiates a communication link between all the recording devices 104a-104d. The event information file, start instructions and the event identification code are transmitted to the audio recording devices 104b-104d. The event information file, start instructions and the event identification code are transmitted to the audio recording devices 104b-104d using at least one of Short Message Service (SMS), Multimedia Messaging Service (MMS), email or automatically using a smartphone App installed on each of the recording devices.

In step 124, each of the recording devices 104a-104d is independently synchronized by each device retrieving exact timing data using a Global Positioning System (GPS) (which provides time accurate to milliseconds), a local beacon (over for example, Wi-Fi or Bluetooth), or internal timing within a smartphone provided by an external part, such as for example, through the Global System for Mobile Communications (GSM).

If the automatic start instruction is used then once the master recording device 104a has confirmed that each of the other recording devices 104b-104d has initiated the audio recording by entering the event identification code and synchronizing, the master recording device 104a automatically transmits a signal to each of the other recording devices 104b-104d to begin recording.

When in recording mode, each of the recording devices 104a-104d independently records only one audio source for the duration of the audio event. Therefore, in the example of a business meeting wherein each of the recording devices 104a-104d is a smartphone, each participant in the business meeting uses their smartphone to record their speech as a discrete recording.

In step 126, once the audio event has finished, the master recording device 104a sends a signal to each of the other recording devices 104b-104d to terminate the recordings. The recordings may be automatic terminated or manually terminated. Upon termination of the meeting, the discrete audio source recording on each recording device 104a-104d is transmitted to the recording synchronizing processor 106.

Upon receipt of the discrete audio source recordings from each recording device 104a-104d, the recording synchronizing processor 106 processes the discrete audio source recordings to construct a single audio event recording representative of the audio event. The single audio event recording is constructed by synchronizing the times throughout the duration of all the discrete audio source recordings with each other and using beamforming techniques. Specifically, the single audio event recording is constructed by measuring the minute differences in arrival times of the audio reaching the different smart phone devices, time in the order of ms, such as at the level of 0.1 ms differences. It is the exploitation of these small differences in arrival times that enable the smartphone microphone array to direct a 'beam', in effect controlling the size, shape, and direction of the acoustic wave, this has the benefit of enhancing speech recognition and suppressing noise. The method may be adaptive and be combined with deep learning-based speech enhancement techniques. This feature may be used in addition to the time stretching technique described earlier.

A copy single audio event recording is then sent, for example by email or FTP, to each participant of the audio event, as required, or provided for downloading from the computer server 108.

In an alternative embodiment, the discrete audio source recordings may be transmitted from the recording devices, 104b-104d, to the master recording device 104a. The master recording device 104a then transmits all the discrete audio source recordings to the recording synchronizing processor 106 which processes the discrete audio source recordings to construct a single audio event recording representative of the audio event.

In an alternative embodiment, whether the discrete audio source recordings are transmitted to the recording synchronizing processor 106 by each of the recording devices, 104a-104d, or through the master recording device 104a, the discrete audio source recordings may be streamed and thereby enabling the recording synchronizing processor 106 to construct the single audio event recording as the audio event is ongoing and before it is terminated.

A preferred embodiment of the present disclosure is to use a smartphone App loaded on smartphones operable to act as the recording devices, 104a-104d. The App operates to set up and obtain the meeting ID, synchronize the times on the recording devices, 104a-104d (e.g. using GPS0, start the recording on all the recording devices, 104a-104d, and terminate the recording on each of the smartphones acting as recording devices, 104a-104d. Synchronizing the times may take place remotely, such as at a remote (e.g. cloud) server. The app then transmits the discrete audio source recordings to the recording synchronizing processor 106, on the server 108, for constructing the single audio event recording representative of the audio event. In the sense of the present disclosure and audio event preferably refers to an activity, such as a meeting between people, in which audio signals are a focus of the event, such as a discussion. The audio event preferably predominantly comprises speech.

Example Embodiments

Example embodiments are provided in the following numbered examples.

Example 1 includes a method of recording an audio event which comprises a plurality of audio sources, the method comprising: synchronizing a plurality of audio recording devices prior to commencement of the audio event, each recording device being suitably disposed to record audio from an audio source and operable to provide a single audio source recording for the duration of the audio event; receiving the single audio source recording provided by each of the said audio recording devices; and processing the plurality of received single audio source recordings to synchronously combining the plurality of single audio source recordings to construct a single audio event recording.

Example 2 includes a method as in example 1, whereby at least one of the recording devices is a smartphone.

Example 3 includes a method as in example 1 or 2, whereby the method comprises providing each of the recording devices with an event identification code, unique to the audio event to be recorded.

Example 4 includes a method as in any of the preceding examples, whereby the method comprises providing each of the recording devices with a start instruction prior to commencement of the audio event.

Example 5 includes a method as in example 4, whereby the start instruction is an automated start instruction operable to synchronously start the recording function on each of the recording devices.

Example 6 includes a method as in example 5, whereby the synchronous start of recording on each of the recording devices is actuated upon receipt of confirmation of entry of an event identification code into each of the recording devices.

Example 7 includes a method as in example 4, whereby the start instruction provides a start alert to each of the said recording devices to inform when a manual start of the recording device can be enacted.

Example 8 includes a method as in example 7, whereby the start alert is provided upon receipt of confirmation of entry of an event identification code into each of the recording devices.

Example 9 includes a method as in any of the preceding numbered example embodiments whereby the plurality of recording devices are synchronized using at least one of: a Global Positioning System, GPS; Global System for Mobile Communications, GSM; and a local beacon.

Example 10 includes a method as in any of the numbered example embodiments whereby an event manager controls the start and synchronization of the plurality of audio recording devices.

Example 11 includes a method as in example 10, whereby the event manager is located on a remote server.

Example 12 includes a method as in example 10, whereby the event manager is located on one of the plurality recording devices.

Example 13 includes a method as in any of the preceding examples, whereby at least one of the recording devices is disposed remote from another of the recording devices.

Example 14 includes a non-tangible computer-readable storage device having instructions stored which, when executed by a computing device, result in the computing device performing operations in accordance with a method according to numbered example embodiments 1 to 13.

Example 15 includes an audio recording system operable to record an event which comprises a plurality of audio sources, the system comprising: an event start synchronizing processor operable to synchronize a plurality of audio recording devices prior to commencement of the audio event, each recording device being suitably disposed to record audio from an audio source and operable to provide a single audio source recording for the duration of the audio event; a receiving processor operable to receive the single audio source recording provided by each of the audio recording devices; a recording synchronizing processor operable to process the single audio source recordings to construct a single audio event recording.

Example 16 includes an audio recording system, wherein at least one of the recording devices is a smartphone.

Example 17 includes an audio recording system, wherein the system comprises an event manager operable to control the start and synchronization of the plurality of audio recording devices.

Example 18 includes an audio recording system as in example 17, wherein the event manager is located on a remote server.

Example 19 includes an audio recording system as in example 17, wherein the event manager is located on one of the plurality recording devices.

Example 20 includes an audio recording system as in numbered example embodiments 17 to 19, wherein the event manager is operable to provide each of the recording devices with an event identification code, unique to the audio event to be recorded.

Example 21 includes an audio recording system as in numbered example embodiments 17 to 20, wherein the event manager is operable to provide each of the recording devices with a start instruction prior to commencement of the audio event.

Example 22 includes an audio recording system as in example 21, whereby the start instruction is an automated start instruction operable to synchronously start the recording function on each of the recording devices.

Example 23 includes an audio recording system as in example 22, wherein the synchronous start of recording on each of the recording devices is actuated upon receipt of confirmation of entry of an event identification code into each of the recording devices.

Example 24 includes an audio recording system as in example 21, wherein the start instruction provides a start alert to each of the said recording devices to inform when a manual start of the recording device can be enacted.

Example 25 includes an audio recording system as in example 24, wherein the start alert is provided upon receipt of confirmation of entry of an event identification code into each of the recording devices.

Example 26 includes an audio recording system as in numbered example embodiments 15 to 25, wherein the plurality of recording devices are synchronized using at least one of: a Global Positioning System, GPS; Global System for Mobile Communications, GSM; and a local beacon.

Example 27 includes an audio recording system as in example 15 to 26, wherein an event manager controls the start and synchronization of the plurality of audio recording devices.

Example 28 includes an audio recording system as in numbered example embodiments 15 to 27, wherein at least one of the recording devices is disposed remote from another of the recording devices.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method of recording an audio event which comprises a plurality of audio sources, the method comprising:
   synchronizing a plurality of audio recording devices prior to commencement of the audio event, each recording device being suitably disposed to record audio from an audio source and operable to provide a single audio source recording for the duration of the audio event, wherein an event manager controls a start and synchronization of the plurality of audio recording devices;
   the event manager, determining a relative time delay for each audio recording device by sending an audio signal to each audio recording device separately and recording a return time of the audio signal; and
   stretching the signal from each audio recording device to provide a simultaneous finish in transmission of the audio to all remote devices based on the time delay;
   receiving the single audio source recording provided by each of the said audio recording devices; and
   processing the plurality of received single audio source recordings to synchronously combining the plurality of single audio source recordings to construct a single audio event recording.

2. The method as claimed in claim 1 whereby the method comprises providing each of the recording devices with an event identification code, unique to the audio event to be recorded.

3. The method as claimed in claim 1 of the preceding claims, whereby the method comprises providing each of the recording devices with a start instruction prior to commencement of the audio event, whereby the start instruction is an automated start instruction operable to synchronously start the recording function on each of the recording devices.

4. The method as claimed in claim 3, whereby the synchronous start of recording on each of the recording devices is actuated subsequent to receipt of confirmation of entry of an event identification code into each of the recording devices.

5. The method as claimed in claim 1, whereby the start instruction provides a start alert to each of the said recording devices to inform when a manual start of the recording device can be enacted.

6. The method as claimed in claim 5, whereby the start alert is provided upon receipt of confirmation of entry of an event identification code into each of the recording devices.

7. The method as claimed in claim 1 whereby the plurality of recording devices are synchronized using at least one of:
   a Global Positioning System, GPS;
   Global System for Mobile Communications, GSM; and a local beacon.

8. A non-transient computer-readable storage device having instructions stored which, when executed by a computing device, result in the computing device performing operations in accordance with a method according to claim 1.

9. An audio recording system operable to record an event which comprises a plurality of audio sources, the system comprising:
   an event start synchronizing processor operable to synchronize a plurality of audio recording devices prior to commencement of the audio event, each recording device being suitably disposed to record audio from an audio source and operable to provide a single audio source recording for the duration of the audio event;
   wherein the event manager determines the relative time delay for each recording device by sending an audio signal to each device separately and recording a return time of the audio signal;
   wherein the signal from each recording device is stretched to provide a simultaneous finish in transmission of the audio to all remote devices based on the time delay;
   a receiving processor operable to receive the single audio source recording provided by each of the audio recording devices;
   a recording synchronizing processor operable to process the single audio source recordings to construct a single audio event recording.

10. The audio recording system of claim 9, wherein the system comprises an event manager operable to control the start and synchronization of the plurality of audio recording devices.

11. The audio recording system as claimed in claim 9, wherein the event manager is operable to provide each of the recording devices with an event identification code, unique to the audio event to be recorded.

12. The audio recording system as claimed in claim 9, wherein the event manager is operable to provide each of the recording devices with a start instruction prior to commencement of the audio event, whereby the start instruction is an automated start instruction operable to synchronously start the recording function on each of the recording devices.

13. The audio recording system as claimed in claim 9, wherein the synchronous start of recording on each of the recording devices is actuated upon receipt of confirmation of entry of an event identification code into each of the recording devices.

14. The audio recording system as claimed in claim 9, wherein the start instruction provides a start alert to each of the said recording devices to inform when a manual start of the recording device can be enacted.

15. The audio recording system as claimed in claim 14, wherein the start alert is provided upon receipt of confirmation of entry of an event identification code into each of the recording devices.

* * * * *